United States Patent [19]

Sedgewick

[11] Patent Number: 4,538,770
[45] Date of Patent: Sep. 3, 1985

[54] APPARATUS FOR WINDING WIRE COILS ON A TOOTHED STACK

[76] Inventor: Richard D. Sedgewick, 100 Horne St., Dover, N.H. 03820

[21] Appl. No.: 424,502

[22] Filed: Sep. 27, 1982

[51] Int. Cl.³ ............................................ H02K 15/085
[52] U.S. Cl. ...................................... 242/1.1 R; 29/596
[58] Field of Search ............ 242/1.1 R, 1.1 E, 7.05 C, 242/7.17, 7.18, 4 C; 29/596, 598, 605; 140/92.1

[56] References Cited

U.S. PATENT DOCUMENTS

| | | | |
|---|---|---|---|
| 2,304,520 | 12/1942 | Wirtz et al. | 242/1.1 R |
| 2,467,643 | 4/1949 | Wirth | 242/4 C |
| 2,847,170 | 8/1958 | Lill et al. | 242/1.1 R |
| 3,226,046 | 12/1965 | Dröll et al. | 242/1.1 R |
| 3,281,084 | 10/1966 | Lill | 242/1.1 E |

FOREIGN PATENT DOCUMENTS 563932 9/1944 United Kingdom ............ 242/1.1 R

*Primary Examiner*—Billy S. Taylor
*Attorney, Agent, or Firm*—Daniel H. Kane, Jr.

[57] ABSTRACT

A wire feed winding needle mounting support and a stack mounting support permit movement of the winding needle and a stack in at least three coordinate axis directions relative to each other. The supports may be formed on separate modules for variable angular orientation relative to each other. A number of motors control relative movement of the winding needle and stack along the three directions for winding selected teeth in the desired distribution. The invention provides as a basic component pliant bearing surface clamp members on either side of the row of teeth of a stack to be wound. A clamp mounting yoke and further motor means alternately move the pliant bearing surfaces toward and away from the row of teeth on either side between a clamp position and an open position. The winding wire filament is alternately clamped against one side of the row of teeth and then the other while the winding needle moves up and down and back and forth "dancing" over the row of teeth seating the wire in slots between teeth of the stack without itself passing between adjacent teeth through the slots. The winding wire is unclamped by releasing the pliant bearing surfaces on both sides of the row of teeth while shifting the stack and row of teeth relative to the winding needle to different slot and tooth locations.

14 Claims, 16 Drawing Figures

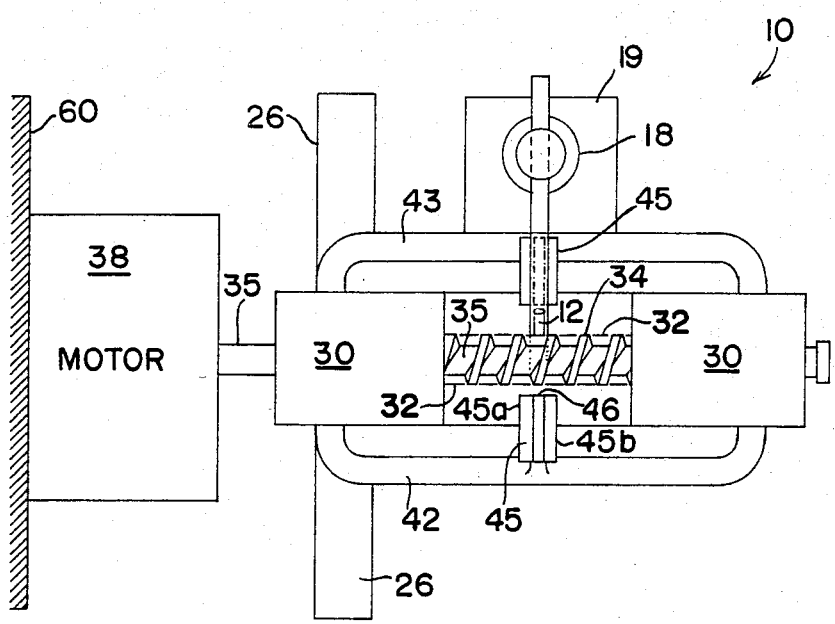
FIG 3
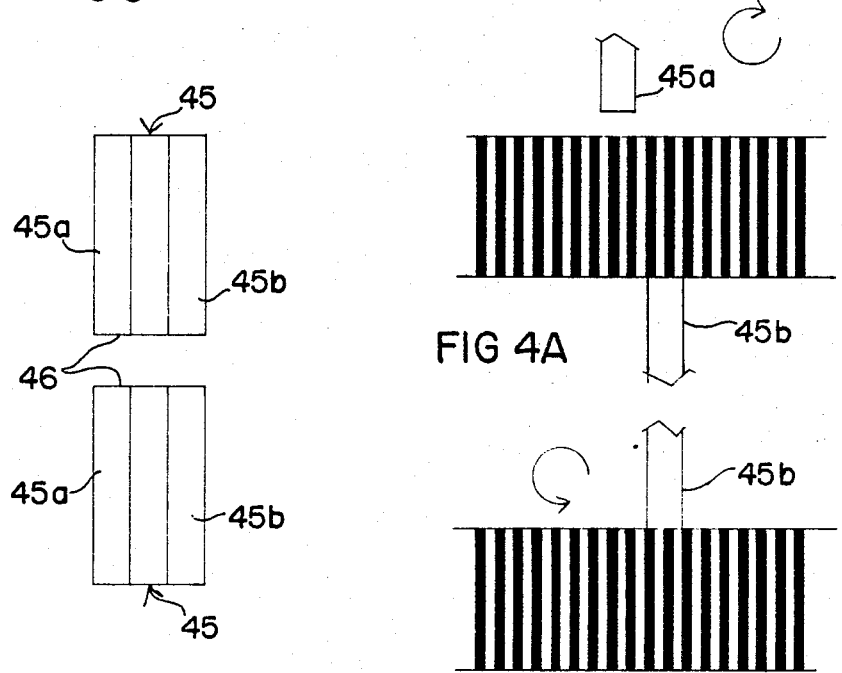
FIG 4
FIG 4A
FIG 4B

4,538,770

APPARATUS FOR WINDING WIRE COILS ON A TOOTHED STACK

TECHNICAL FIELD

This invention relates to a new winding apparatus and method for winding wire around selected teeth of a toothed or slotted iron core or stack. The invention is applicable to a variety of complex windings.

BACKGROUND ART

Complex stack or core windings are required for certain motor and sensor applications. For example, the stator and rotor windings used in angle sensitive transformer resolvers require a complex distribution of annular turns for measuring angles. Typically, a tapered distribution of copper turns on iron teeth is utilized.

For high resolution angle resolvers, the teeth of the stack are formed correspondingly closer together. At sufficiently high resolutions the high density of the teeth and narrowness of the slots prevent a wire feed winding needle from passing through the slots between teeth to form the turns of wire. Yet turns of wire must be wound at different controlled depths on the teeth and with spans extending around different numbers of teeth. Furthermore, the turns may have to be formed within the small space defined by an annular stack with inwardly projecting teeth.

Conventional flying head core winding machines do not lend themselves to achieving such distributions. In particular, they are inapplicable to annular stack configurations having teeth extending radially inwardly. The typical single and double flier type core winding machines such as, for example, described in U.S. Pat. Nos. 3,973,738; 3,857,172; 3,705,459; and 2,949,554 are adapted for winding around radially outwardly projecting teeth only. Even with radially outwardly projecting teeth flying head machines generally wind only large spans of teeth and cannot wind turns of wire around single teeth or small spans.

OBJECTS OF THE INVENTION

It is therefore an object of the present invention to provide a stack winding method and apparatus for automatically winding selected teeth of a toothed or slotted stack with windings of tapered or other irregular distributions of copper. In particular, the invention is adapted for accurate placement of wire turns at selected specified depths on teeth of a stack, for winding single teeth or small spans of teeth, and for winding turns of wire at high density in small spaces.

Another object of the invention is to provide an inexpensive method and apparatus for automating the winding of complex distributions of copper on slotted and toothed stacks having high density teeth and narrow slots, particularly where a wire feed winding needle cannot pass through the slots between teeth.

A further object of the invention is to provide an automated method and apparatus for stack winding of slotted and toothed stacks of varied configuration including both linear and annular stack configurations and annular stacks having either radially inwardly projecting or radially outwardly projecting teeth, or teeth arranged on axes skewed or angled relative to the stack axis.

DISCLOSURE OF THE INVENTION

In order to accomplish these results the present invention provides a stack winding apparatus using a wire feed winding needle of the hollow type for feeding and winding wire around selected teeth of the stack or core. According to the invention, the winding needle and stack are mounted on supports for movement relative to each other in three coordinate axis directions.

According to the invention the needle, rather than passing through the slots between teeth, "dances" over the teeth in alignment with a slot, moving up from the base or other selected depth of the teeth, across the teeth and down on the other side thereby laying wire in a slot. During this movement, the wire is held in place at the base or other selected depth of a slot on the side of the teeth by novel pushers or clamps of pliant material.

The stack and winding needle then translate relative to each other along the row of teeth to another slot location. There, the winding needle "dances" back over to complete a turn. While laying the wire in the second slot by movement up, across the teeth and down, the wire is again retained in place at the base or other selected depth of the teeth by a pliant pusher or clamp on the other side. Thus, according to the invention the winding needle forms the turns of copper wire not by passing through the slots but by "dancing" back and forth over the row of teeth in alignment with slots.

This action is achieved by motion of the winding needle and stack relative to each other in three mutually perpendicular coordinate axis direction. A first direction is back and forth across the row of teeth from one side to the other. A second direction is up and down parallel to the teeth, and a third direction is along the row of teeth.

For example, in one embodiment the winding needle mounting support comprises a swing plate mounted on an axle for rotational motion through a prescribed and limited arc. A translating needle carrier is further mounted on the swing plate for imparting translational motion to the winding needle relative to the swing plate. The needle carrier operates by extending and retracting a needle mounting arm which extends beyond the side of the swing plate.

The wire feed winding needle is mounted at the end of the needle mounting arm and therefore translates back and forth across a row of teeth in the first coordinate axis direction upon rotational motion of the swing plate through the prescribed arc. In addition, extension and retraction of the needle arm by the needle carrier imparts translational motion up and down parallel with the slots to the winding needle in the second substantially orthogonal coordinate axis direction.

The iron stack or core to be wound is supported in a stack mounting plate constructed and arranged for imparting independent movement to the toothed stack relative to the winding needle and needle mounting arm in yet a third coordinate axis direction generally along the row of teeth of the stack. Thus, the row of teeth may be shifted left and right relative to the winding needle. Where the slotted stack is of annular configuration movement of the stack and row of teeth relative to the winding needle is accomplished by rotating the stack in opposite clockwise and counterclockwise rotational directions. The stack mounting plate positions the row of teeth of the stack or core at a location beneath or adjacent to the winding needle with the winding needle in alignment with a slot.

A number of motors may provide the relative movement between the stack and winding needle. For example, a first motor drives the needle mounting support for motion of the needle back and forth in the first direction across the stack to either side of the row of teeth. In one embodiment this is accomplished by engaging the swing plate to move the swing plate back and forth through a prescribed arc. A second motor drives the needle carrier and needle mounting arm for extension and retraction for moving the winding needle up and down along the second direction parallel with the slots and teeth of the stack.

A third motor is coupled to the stack mounting plate for moving the stack itself and row of teeth right and left relative to the winding needle in a third substantially orthogonal axial direction along the row of teeth of the stack. For example, the third motor drives a worm gear which engages the geared periphery of a circular frame in the stack mounting plate for rotational motion of annual configuration stacks and cores.

However, a variety of arrangements and configurations may be constructed for imparting relative motion between the winding needle and stack along three perpendicular coordinate axis directions. In a preferred form of the winding apparatus the winding needle and needle arm are mounted on a first winding apparatus module which imparts motion to the winding needle in the first and second orthogonal coordinate axis directions. The toothed stack is mounted on a second winding apparatus module for movement of the row of teeth relative to the winding needle in a third coordinate axis direction. The modules are juxtaposed so that the winding needle "dances" over the row of teeth without passing through the slots laying turns of wire according to the method of the invention around desired spans of teeth.

The invention further provides as a basic element wire clamps or pushers made of pliable material such as rubber positioned on either side of the row of teeth of the stack. A clamp mounting support mounts the clamps for movement toward and away from the row of teeth between a clamp position and an open position. In the clamp position the pliant bearing surface of the clamp or pusher bears against a portion of one side of the row of teeth of the stack, conforming to the surface of any winding already formed around selected teeth. As a result, the winding wire filament and windings of wire already formed are held in place near the base of a slot or at a desired depth while the winding needle "dances" over the row of teeth, moving relative to the stack back and forth or up and down seating windings of wire filament in selected slots. In the open position when the pliant bearing surfaces of the clamps or pushers are withdrawn and released the stack and row of teeth or the winding needle are moved in the third direction along the row of teeth relative to each other for subsequently winding wire filament around teeth and through slots at further locations.

A feature and advantage of the winding wire pusher or clamp according to the invention is that turns of wire can be held in place at any selected depth along the height of a tooth. The winding needle lays the wire at the desired depth in a slot and the pusher holds it in place against a tooth while the winding needle moves up and over the row of teeth to the correct depth on the other side of the row.

In the swing plate form of the invention a clamp yoke is formed coaxially around the axle for independent rotational movement relative to the axle. The clamp yoke is formed with first and second yoke arms extending on either side of the axle and swing plate. A clamp or pusher mounting arm extends from each of the respective first and second yoke arms in a direction parallel with the needle mounting arm. Each clamp or pusher comprises a member of pliable material such as rubber mounted respectively on the clamp mounting arms. A fourth motor drives the clamp yoke for imparting reciprocal rotational motion so that the pliant surface of the clamps or pushers alternately extend back and forth between the clamp position and the open position. The stack mounting plate positions the stack and row of teeth at a location below or adjacent the winding needle and between the clamps or pushers supported by the clamp yoke.

In a preferred form of the invention using first and second stack winding apparatus modules, the pliant clamps or pushers and clamp arms extend from a rotatable shaft mounted from the second module for pushing and retracting the clamps between the clamp position and release position. A feature and advantage of the two module winding apparatus is that the first and second modules can be oriented at an angle relative to each other for winding angled or skewed teeth as well as right angle teeth. Thus, the axes of the teeth and slots may be offset at an angle to the stack axis.

According to the stack winding method the present invention contemplates positioning relative to each other at a first location the wire feeding winding needle and a toothed stack to be wound. The wire is placed at a desired depth relative to the teeth and slots. The invention then provides for clamping the winding wire or filament from the winding needle against one side of the row of teeth of the stack using the pliant surface of the clamp or pusher thereby holding the wire at the first location. At each such location, the winding needle is generally aligned with a slot.

The invention then contemplates the steps of raising the winding needle from a position adjacent to the base of the row of teeth of the stack or other desired depth to a position above the row of teeth, moving the winding needle from a position on one side of the row of teeth to a position on the other side, and then lowering the winding needle to a position adjacent to the base of the row of teeth or other desired depth so that wire is seated in the slot between teeth of the row. These steps of raising the winding needle, moving it across the row, and then lowering it on the other side all take place while clamping the winding wire against the row of teeth on the initial side at the desired wire turn location. Furthermore, the characterization used herein that the winding needle "dances" over the row of teeth in laying turns of copper wire refers to these steps.

Further steps follow according to the invention of unclamping the wire on the one side by releasing the pliant surface of the clamp and moving the stack and row of teeth relative to the winding needle to a second location at which the winding needle is aligned with a slot.

A series of similar steps then follows on the other side by clamping the wire at a desired depth against the other side of the row of teeth with the pliant surface of a clamp or pusher according to the invention and then in sequence raising the winding needle from a position at the desired depth to a position above the row of teeth, moving the winding needle from the position on the other side of the row of teeth back to a position on the initial side, and then lowering the winding needle to the desired depth so that the wire is seated in another slot between teeth of the row, thereby completing a turn or partial turn of wire.

Finally the method provides for unclamping the wire on the other side by releasing the pliant surface of the clamp or pusher and again moving the stack and row of teeth relative to the winding needle to another location. The foregoing steps by which the winding needle dances over the row of teeth laying turns of wire are of course repeated according to a programmed sequence either manually or by the use of automated machinery and controls to complete windings around selected teeth in the desired distribution pattern and configuration.

According to the preferred form of the invention the method is applicable to stacks of annular configuration and the step of moving the stack and row of teeth relative to the winding needle is accomplished by reciprocal rotation of the stack in clockwise and counterclockwise directions relative to the winding needle. In this respect the method and apparatus of the invention are applicable to annular stacks or cores which are slotted or toothed around either the inner periphery or circumference or the outer periphery or circumference, or on both sides. Furthermore, the invention is applicable to linear cores having rows of teeth in linear or other noncircular configuration. The method permits winding coils of different densities and numbers of turns, around different spans of teeth including a single tooth, and with accurate placement along the depth of the teeth and slots.

Throughout the winding method specified tension is maintained on the winding wire passing through the winding needle for achieving neat, well placed and taught turns of wire filament in each winding. Such a wire tensioning device or arrangements may be mounted on the stack mounting plate or other portion of the apparatus to achieve the desired tension as the wire feeds to the winding needle. Other objects, features and advantages of the present invention will become apparent in the following specification and accompanying drawings.

BRIEF DESCRIPTION OF THE DRAWINGS

FIG. 3 is a plan view from above of the stack winding machine.

FIG. 4 is a detail fragmentary plan view from above looking at opposite clamps or pushers, while FIGS. 4A and 4B are diagrammatic views from above showing the diagonally juxtaposed operative portions of the clamps or pushers according to the direction of movement of the stack or row of teeth.

DESCRIPTION OF PREFERRED EXAMPLE EMBODIMENTS AND BEST MODE OF THE INVENTION

Figure 1:
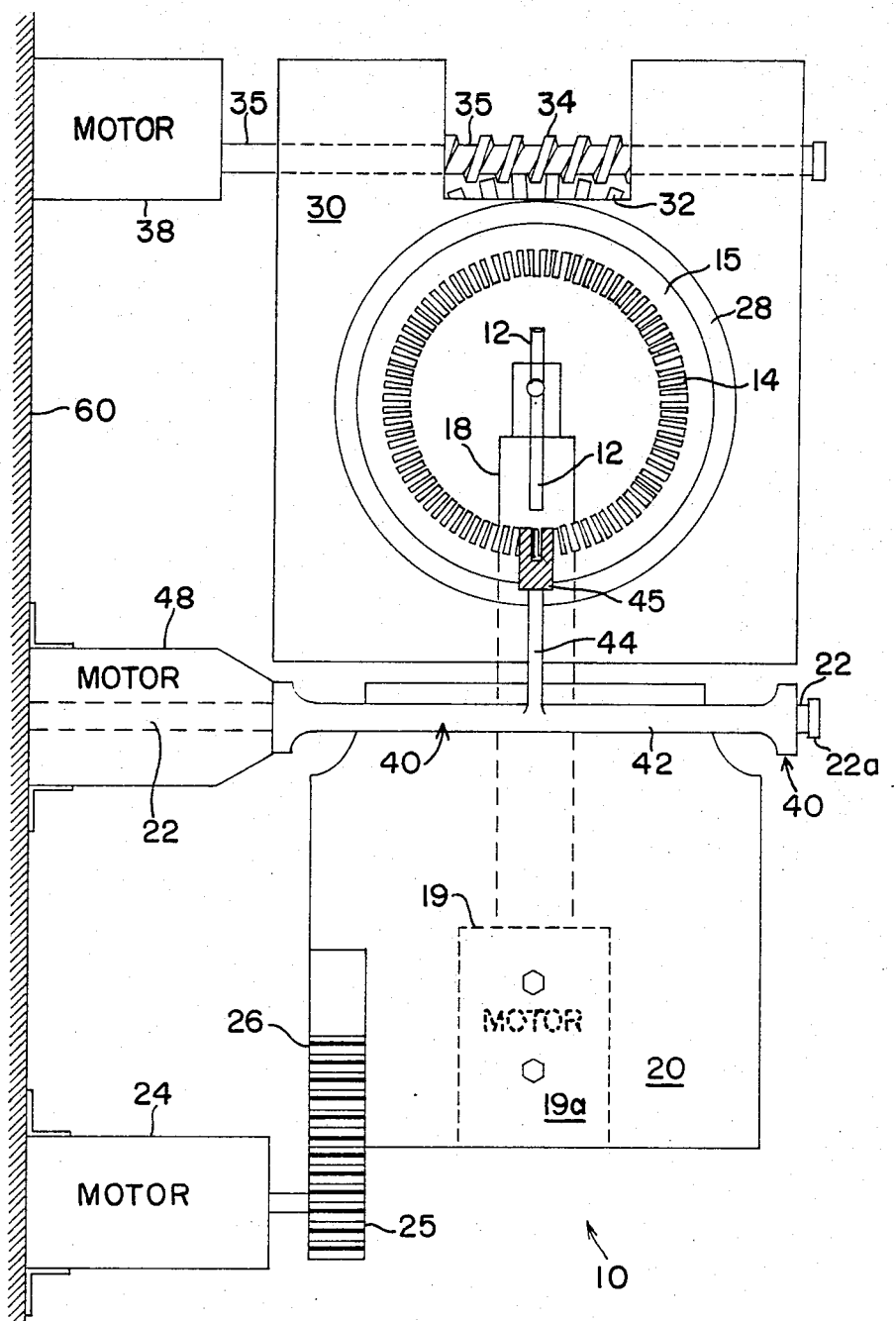
FIG. 1 is a plan view from the front of the stack winding machine according to the present invention.
Figure 2:
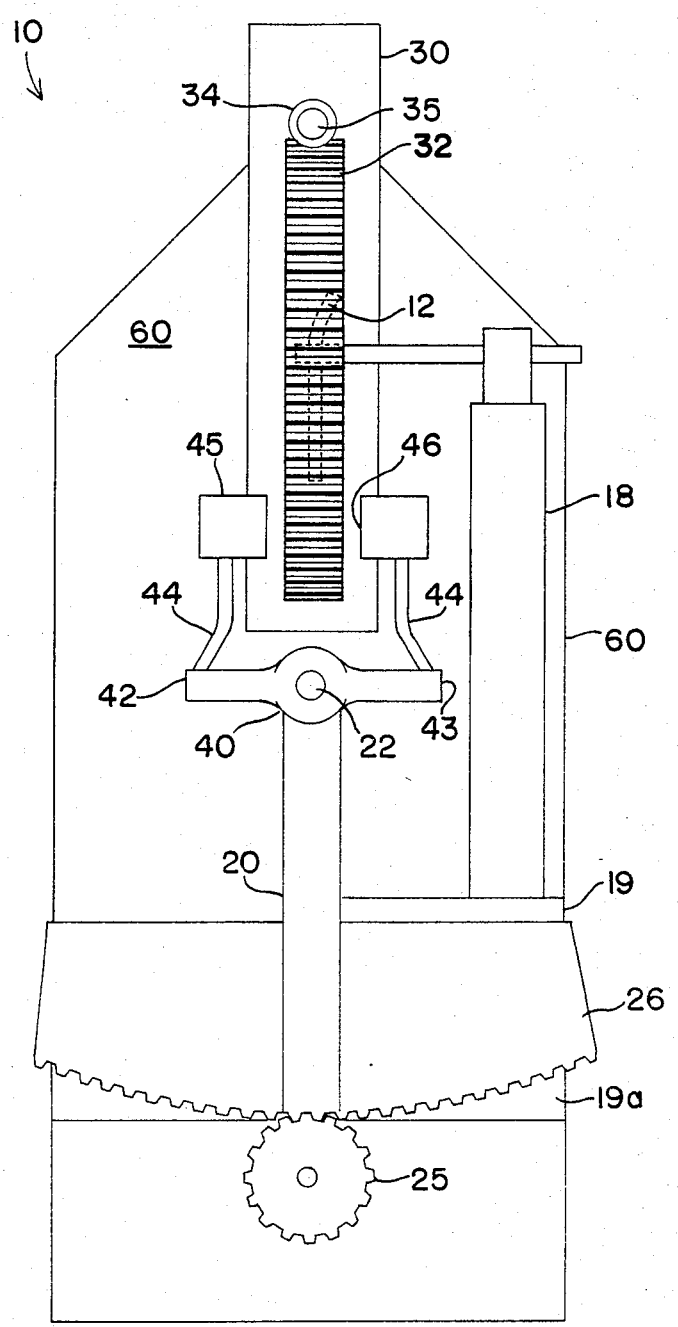
FIG. 2 is a side view of the stack winding machine.

A stack winding machine or apparatus 10 according to the invention is illustrated in FIGS. 1-3. As there shown, winding wire or filament 11 is fed through a hollow wire feed winding needle 12 for winding in a selected pattern around the teeth 14 of slotted stack or core 15. In the embodiment of FIGS. 1-3 a stack or core 15 of annular configuration is shown. Furthermore, the annular stack 15 is slotted or toothed around its inner periphery or circumference. As is hereafter apparent, the invention is applicable also to annular stacks slotted or toothed around the outer periphery or circumference and to linear stacks having at least a row of teeth.

The winding needle 12 is of the hollow type for feeding and winding wire held under selected tension by a standard tensioning means or device, not shown, which may be mounted on the apparatus. The winding wire is delivered through the tensioning device from a source not shown.

Winding needle 12 is mounted on the needle mounting arm 18 which extends from the needle carrier 19 which in turn is mounted on and connected to a swing plate or needle mounting plate 20. The needle swing plate 20 is mounted for rotational movement on an axle 22. The swing plate 20 undergoes reciprocal rotation through a prescribed arc and is driven in this swinging or rotational movement by a first drive motor 24 which rotates a gear element 25. The rotating gear 25 engages a rack 26 mounted at the free end of swing plate 20 for rotational motion or swinging motion of swing plate 20 through a prescribed arc. As a result of the swinging motion of plate 20 the winding needle 12 undergoes translation back and forth across the row of teeth 12 from one side of the teeth to the other side in a first coordinate axis direction.

The needle carrier 19 from which extends the needle mounting arm 18 includes a winding needle motor 19a which extends and retracts the needle arm 18 by, for example, driving a conventional lead screw which lifts needle arm 18 up and down on a threaded sleeve or nut for imparting up and down motion of the winding needle 12 in a second coordinate axis direction parallel to the slots between the selected teeth 14 around which the wire is being wound.

The annular stack or core 15 is mounted for rotational movement in a circular frame or insert 28 in turn supported in a stack mounting plate 30 positioned adjacent to the swing plate 20. The stack mounting plate 30 is fixed in stationary postion while the circular frame or insert 28 may rotate relative to the stack plate 30. In order to effect the rotation of the stack 15 within the stack mounting plate 20 the circular frame or insert 28 is formed around its outer periphery with a geared surface 32.

A worm gear 34 external to the mounting plate 30 engages the complimentary surface 32 formed around the periphery of insert 28. The worm gear may be formed on the axle 22 below the stack 15 and insert 28 or on a separate axle 35 positioned at the top of stack mounting plate 30 above the stack 15 and insert 28 as shown in FIG. 1. The worm gear 34 which engages the complementary gears 32 of the insert 28 is driven by a third motor 38 which upon rotation translates or moves the row of teeth 14 back and forth in the vicinity of winding needle 12 in a third coordinate axis direction orthogonal to the first and second directions. A feature and advantage of this arrangement is that the stack may be shifted left or right as many teeth as desired for winding turns around different numbers of teeth, e.g. 1, 2, 3 teeth at a time, etc. After each stack shift the winding needle is aligned with a slot when the stack stops.

Another basic element of the stack winding apparatus according to the invention is a clamp yoke 40 fitted and mounted around axle 22 for free rotation relative to the axle. The clamp yoke 40 includes elongate yoke arms 42 and 43 which extend on either side of the axle 22 and swing plate 20. A clamp or pusher block support arm 44 extends from each yoke arm 42 and 43. A clamp, pusher, or block 45 made of resilient material such as rubber is mounted at the end of the each of the clamp arms 44 extending from the respective yoke arms 42 and 43. As shown in FIG. 3 and also in more detail in FIG. 4, each clamp block 45 includes spaced apart clamping elements 45a and 45b spaced from each other a distance corresponding to the spacing of the teeth 14 of the stack or core 15 to be wound.

The fixed elements of the stack winding apparatus including stack mounting plate 30, motors 24, 48 and 38 and axle 22 are fixed and mounted to a side frame 60 shown in FIG. 3.

As is apparent in FIGS. 1-3 the stack mounting plate 30 positions the stack or core 15 to be wound at a location adjacent to swing plate 20 so that the selected teeth at the row of teeth 14 to be wound are positioned beneath or adjacent to winding needle 12 and between the clamp blocks 45. The clamp yoke 40 is driven for reciprocal rotational motion relative to the axle 22 by means of a fourth motor 48. By rotational motion of clamp yoke 40 the clamp blocks or pushers 45 are alternately applied to and fro against a portion of the row of teeth 14 of stack 15 between a clamp position and an open position. In the clamp position the resilient face 46 of clamp block 45 is applied against a portion of the side of the row of teeth and the resilient surface 46 yields and conforms to the irregular surface on the side where previous windings may have already been formed. In this manner, the winding wire is held securely against the side of the teeth for further winding operations as hereafter described without injury or damage to the wire.

The clamping blocks or pushers 45 positioned on either side of the stack to be wound are shown in further detail in FIG. 4. It is noted that each clamp block or pusher 45 of pliant material such as rubber includes two clamp elements 45a and 45b which generally coincide with adjacent portions of the row of teeth 14 of the stack 15. During the winding operation as hereafter described only one of the elements 45a or 45b on either side is actually operative to secure the winding wire at the desired location. Thus, only the diagonally opposite elements 45a and 45b are operative according to the direction of translation and direction of winding as shown in FIGS. 4A and 4B. The detailed sequence of steps for stack winding according to the method of the present invention and the corresponding operation of the winding wire clamps or blocks are further elucidated with reference to FIGS. 5A through 5I.

Figure 5A:
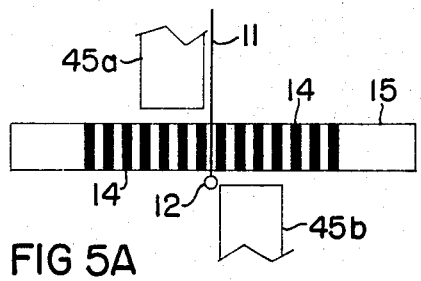
FIGS. 5A through 5I are diagrammatic views from above showing the sequence of steps for stack winding around selected teeth of a tooth or slotted stack according to the present invention.
Figure 5E:
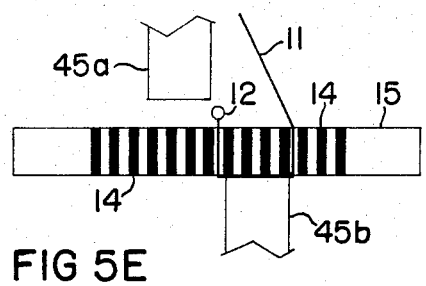
Figure 5B:
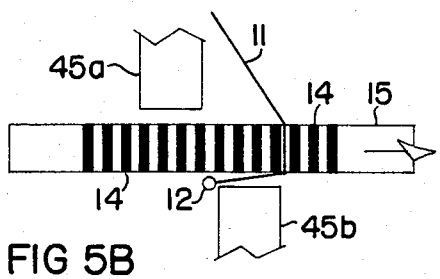

At the outset of the winding operation the wire feed winding needle 12 and toothed stack to be wound 15 are positioned relative to each other to initiate the winding operation. In particular, the winding needle 12 and toothed stack 15 are positioned relative to each other at a first location as illustrated in FIG. 5B. At this location the winding wire is clamped against one side of the row of teeth 14 by the pliant bearing surface 46 of clamp block or pliant member 45b which is moved into the clamping position as shown in FIG. 5C.

In the illustrated steps of FIG. 5 the stack 15 may represent either a linear stack or annular stack having a row of teeth 14 in a generally linear sequence either as the straight row of a linear stack or as the portion of a row of teeth from the inner or outer periphery of an annular stack. While clamp block element 45b is in the clamp position, clamp element 45a on the opposite side of the row of teeth 14 is in the open position. Furthermore, throughout the initial steps illustrated in FIGS. 5B and 5C the winding needle 12 is at a location on one side of the row of teeth adjacent to the base of the slots between the teeth 14 for seating the winding wire 11 at the base of a slot.

Figure 5F:
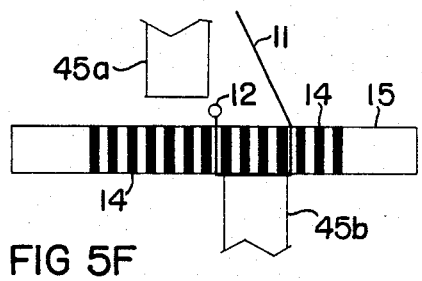
Figure 5C:
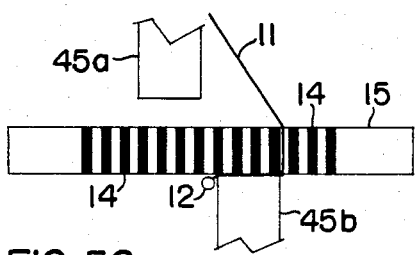
Figure 5G:
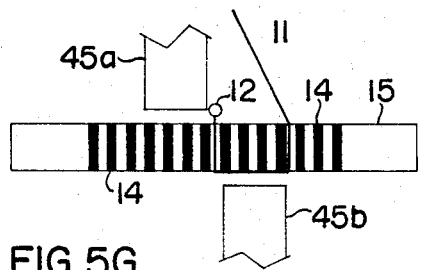
Figure 5D:
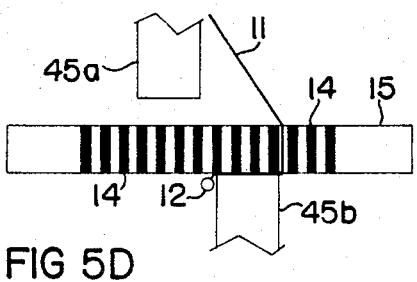

After clamping as shown in FIG. 5C, the winding needle 12 is raised upward in the second coordinate axis direction parallel to the direction of teeth as shown in FIG. 5D. While FIG. 5D has the same appearance as FIG. 5C because it is a plan view from above, it should be kept in mind that the winding needle 12 is in a lower position adjacent to the base of the slots between teeth 14 in FIG. 5C and in raised position above the teeth 14 in FIG. 5D.

In the next step according to the stack winding method the winding needle 12 traverses across and over the row of teeth 14 from one side of the stack to the other side in the first coordinate axis direction while the winding wire 11 is clamped against the initial side of the row of teeth 14. The needle then drops from the raised position above the row of teeth 14 to a lower position adjacent the base of the slots and respective teeth 14 as shown in FIG. 5F. While FIG. 5F appears similar to FIG. 5E because it is a plan view it should be kept in mind that the winding needle 12 is in raised position in FIG. 5E and in lowered position in FIG. 5F.

The back and forth motion of winding needle 12 from one side of the row of teeth 12 to the other is effected by the first motor 24 swinging or rotating the swing plate 20 through a prescribed arc. The motion of winding needle 12 up and down in the second axial direction is implemented by needle carrier motor 19a extending and retracting the needle mounting arm 18 and therefore raising and lowering the winding needle 12 relative to the row of teeth 14. Throughout such steps, the winding needle is always in alignment with a slot for laying wire in the slot but without passing through the slot.

Figure 5H:
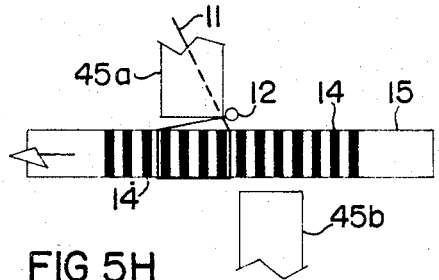
Figure 5I:
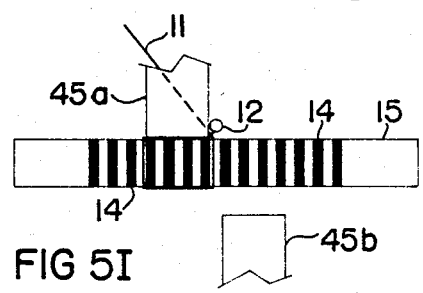

The clamp block 45b is then released and clamp block elements 45a and 45b on opposite sides of stack 15 are temporarily both in the open position as shown in FIG. 5G. With the clamp blocks both in open position the row of teeth 14 is then translated back to the left relative to the winding needle and clamp blocks which in the case of the annular configuration stack is effected by clockwise rotation of stack 15 within the rotating frame or insert 28 of stack mounting block 30. In the event a linear stack is wound the row of teeth is simply translated in the desired direction. Movement of the stack 15 and row of teeth 14 to the left relative to winding needle 12 and clamp blocks 45a and 45b is illustrated in FIG. 5H.

The opposite clamp block element 45a is then actuated to the clamping position by fourth motor 48 and clamp yoke 40 pushing and clamping the winding wire 11 against the other side of the row of teeth 14. A sequence of steps then follows with clamp block element 45b in clamping position comprising raising the winding needle 12 from a position adjacent the base of the row of teeth to a position above the row of teeth; moving the winding needle from the position on the other side of the row of teeth to a position on the initial side of the row of teeth: and lowering the winding needle once again to a position adjacent to the base of the row of teeth so that the winding wire is again seated in a slot between teeth 14 of the row. However, at no time does the winding needle pass through a slot.

Clamp block element 45b is then released and while the clamping members 45a and 45b on opposite sides of the row of teeth are both in open position the step follows of again moving the stack 15 and row of teeth 14 this time to the right relative to the winding needle 12 to another location for further winding operations.

It is apparent from the sequence of steps set forth above that in the method of stack winding according to the present invention the winding needle "dances" up and down and back and forth over the row of teeth in alignment with a slot seating the winding wire in slots between respective teeth of the stack. During the "dance" of the winding needle, the clamping blocks or elements alternately clamp the winding wire against one side of the row of teeth and then the other side by means of the pliant surface while the winding needle moves up and down and back and forth over the row of teeth. Of equal importance, the clamping blocks or elements on opposite sides of the stack release the pliant surfaces from either side of the row of teeth and both remain in open position while the stack and row of teeth move relative to the winding needle and clamp blocks or elements to different slot and teeth locations of the stack. A diagrammatic and perspective representation of the "dance" of the winding needle according to the method of the present invention is illustrated in FIG. 6.

Figure 6:
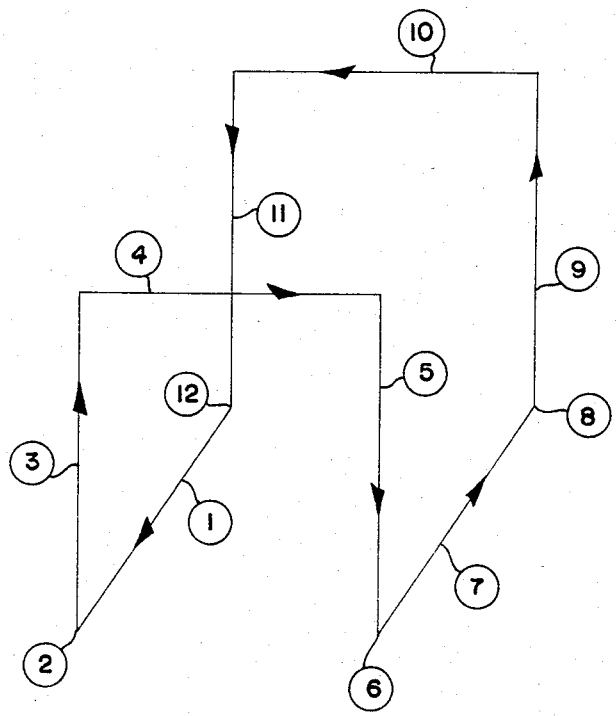
FIG. 6 is a diagrammatic perspective view or flow diagram summarizing the stack winding method according to the invention in a single consolidated diagram.

In FIG. 6 the sequence of steps according to the stack winding method are renumbered 1 through 12 for convenience. In step 1 the stack is rotated to place the row of teeth in positon relative to the stack winding needle at a first location. At the end of step 1 the clamping member or block on the one side or initial side of the row of teeth is actuated into the clamping position against the winding wire and row of teeth represented in the diagram by numeral 2. The winding needle then rises above the row of teeth represented by line 3, traverses over or across the row of teeth represented by line 4, and lowers on the other side to the base of a slot of the row of teeth represented by line 5. By this sequence of steps the winding wire is seated in the base of a slot at the desired first location. The first clamping block or member on the initial side of the row of teeth is then released represented by the corner designation numeral 6 and while the clamps on both sides of the row of teeth are in open position the stack is rotated or translated represented by line 7 to a position relative to the winding wire at a second location. After each stack shift, a slot in the row of teeth is aligned with the winding needle.

At the second location the clamp or clamping member on the other side of the row of teeth, that is the second clamping member, is actuated to the clamp position clamping and holding the winding wire against the opposite side of the row of teeth which step is represented by the corner designation numeral 8. While the second clamping member on the opposite side of the row of teeth is in clamp position the winding needle rises from a position at the base of the slot and teeth at the second location to a raised position above the row of teeth represented by line 9. The winding needle then traverses or translates across and over the row of teeth represented by line 10, and then lowers on the initial side to a position at the base of the slot at the second location represented by line 11.

The second clamp on the opposite side of the row of teeth is then released and while both clamps are in open position the stack may be rotated or translated placing the row of teeth relative to the winding needle in another location for further winding operations.

A critical feature of the method according to the present invention is the interrelationship of the "dance" of the winding needle and the actuation of the pliant surface clamps or clamping blocks between the clamp position and open position. Referring to FIG. 6, during steps 3, 4, and 5 the winding wire is clamped against the initial side of the row of teeth by the clamping block on that side. During steps 9, 10, and 11 the winding wire is clamped against the opposite side of the row of teeth. During steps 1 and 7 both clamping blocks on either side of the row of teeth are in open position.

A sequential listing of each of the steps corresponding to FIG. 6 and the corresponding state of the stack winding elements is found in Table I. During most of the steps the stack and row of teeth are stopped and in fixed position. However, at appropriate steps in the method the stack or row of teeth typically alternately shift left and then right or rotate clockwise and then counterclockwise. The alternate right and left shifts or clockwise and counterclockwise rotational shifts alternately position the stack and row of teeth relative to the winding needle for placing multiple turns of wire in the desired copper density distributions such as the tapered distributions required for angle resolver transformer windings.

It will be readily apparent to one skilled in the art that the four motors actuating and driving the moving elements of the stack winding apparatus and method may be automatically controlled in desired programmed sequences using, for example, a microprocessor. In this way complex winding distributions may be achieved and automated in accordance with the apparatus and method of the present invention. Furthermore, a variety of other hardware arrangements may be used for achieving relative motion between the winding needle and stack in three coordinate axis directions.

While the invention has been described with reference to particular example embodiments, it is intended to cover all variations and equivalents within the scope of the following claims.

TABLE I

| STEP | WIRE GUIDE NEEDLE POSITION | CLAMP #1 POSITION | STACK | CLAMP #2 POSITION |
| --- | --- | --- | --- | --- |
| 1 | Down | Open | Shift Right | Open |
| 2 | Down | Clamp | Stop | Open |
| 3 | Up | Clamp | Stop | Open |
| 4 | Traverse | Clamp | Stop | Open |
| 5 | Down | Clamp | Stop | Open |
| 6 | Down | Open | Stop | Open |
| 7 | Down | Open | Shift Left | Open |
| 8 | Down | Open | Stop | Clamp |
| 9 | Up | Open | Stop | Clamp |
| 10 | Traverse | Open | Stop | Clamp |
| 11 | Down | Open | Stop | Clamp |
| 12 | Down | Open | Shift | Open |

TABLE I-continued

| STEP | WIRE GUIDE NEEDLE POSITION | CLAMP #1 POSITION | STACK | CLAMP #2 POSITION |
|------|---------------------------|-------------------|-------|-------------------|
|      |                           |                   | Right |                   |

I claim:

1. Stack winding apparatus for winding wire around selected teeth of a toothed or slotted stack having at least a row of teeth comprising:
   wire feed winding guide means for guiding wire around selected teeth of the stack;
   guide mounting means operatively supporting said winding guide means for movement in at least two coordinate axis directions relative to the stack to be wound;
   stack mounting means for operatively supporting a toothed stack for movement relative to said winding guide means and guide mounting means in a third coordinate axis direction along a row of teeth;
   first motor means operatively coupled to said guide mounting means for moving said winding guide means back and forth in a first coordinate axis direction across the stack of either side of the row of teeth;
   second motor means operatively coupled to said guide mounting means for moving said winding guide means up and down in a second coordinate axis direction substantially parallel with the teeth and slots of the stack;
   third motor means operatively arranged for moving a stack mounted in the stack mounting means relative to the winding guide means in a third coordinate axis direction along a row of teeth of the stack;
   clamp means operatively positioned on either side of the row of teeth, said clamp means formed with pliant bearing surfaces in the direction facing said teeth;
   clamp mounting means operatively mounting said clamp means for movement toward and away from said row of teeth between a clamp position and an open position, in which clamp position the pliant bearing surface of said clamp means bears against a portion of one side of the row of teeth conforming to the surface of any winding already formed around selected teeth whereby the winding wire is held in place while the winding guide means moves relative to said stack in said first and second coordinate axis directions back and forth across the row of teeth, and up and down parallel to the teeth and slots, and in which open position the stack moves in the third coordinate axis direction along the row of teeth relative to said winding guide means for winding wire around teeth and through slots at further locations;
   fourth motor means operatively coupled to said clamp mounting means for moving said clamp means alternately between said clamp and open positions.

2. The stack winding apparatus of claim 1 wherein the guide mounting means comprises an axle and a swing plate mounted on said axle for rotational motion through a prescribed arc and a translating guide carrier mounted on the swing plate for imparting translational motion relative to said swing plate.

3. The stack winding apparatus of claim 2 wherein said guide carrier comprises a guide mounting arm extending from said guide carrier beyond a side of the swing plate, said winding guide means mounted at the end of said arm away from the guide carrier and swing plate whereby rotational motion of said swing plate through the prescribed arc imparts back and forth motion to said guide means substantially along a first coordinate axis direction and wherein said guide carrier is constructed and operatively arranged for extension and retraction of said guide arm for imparting up and down motion to said winding guide means along a second coordinate axis direction.

4. The stack winding apparatus of claim 3 further comprising gear and rack means operatively coupling said first motor means to said swing plate for imparting rotational motion over a specified arc.

5. The stack winding apparatus of claim 3 wherein said stack mounting means comprises a mounting plate ring for mounting stacks of annular configuration, said mounting plate ring formed with a geared periphery and further comprising worm gear means engaging said geared periphery, said third motor means operatively coupled to said worm gear means for rotating the stack and thereby translating the row of teeth relative to said winding guide means.

6. The appararus of claim 3 wherein said clamp mounting means comprises clamp yoke means formed coaxially around said swing plate axle for independent rotational movement relative to said axle, said clamp yoke means comprising first and second yoke arms extending on either side of said axle and swing plate, and first and second clamp mounting arms extending from said respective first and second yoke arms in a direction parallel with the needle mounting arm, said clamp means comprising first and second flat pliable surface pushers mounted respectively on said first and second clamp mounting arms, said fourth motor means operatively coupled to said yoke means for imparting rotational motion whereby said pliant surface pushers alternately extend forward and back between said clamp position and said open position.

7. The stack winding apparatus of claim 6 wherein each said first and second pliable surface pusher comprises spaced apart adjacent pushing elements for engaging in the clamp position the side of a row of teeth at different tooth locations.

8. The stack winding apparatus of claim 6 wherein said stack mounting means comprises a stack mounting plate for mounting said stack with a row of teeth between said pliant surface pushers and generally below the winding needle means supported on said needle mounting arm.

9. Stack winding apparatus for winding wire around selected teeth of a toothed or slotted stack having at least a row of teeth comprising:
   wire feed winding needle means for feeding and winding wire around selected teeth of the stack;
   needle mounting means operatively supporting said winding needle means for movement relative to the stack back and forth over the row of teeth;
   stack mounting means for operatively supporting a toothed stack for lateral movement relative to said winding needle means and needle mounting means;
   said needle mounting means and stack mounting means constructed and arranged for movement relative to each other of the winding needle means and the row of teeth of a stack to be wound, in three substantially perpendicular coordinate axis directions;

means for moving said winding needle means and the row of teeth of a stack to be wound in said three coordinate axis directions relative to each other for laying wire in the slots without the winding needle means passing through said slots;

wire holding clamp means operatively positioned on either side of the row of teeth of a toothed or slotted stack, each said clamp means formed with a substantially flat pliant bearing surface in the direction facing said teeth;

clamp mounting means operatively mounting each said clamp means for movement toward and away from said row of teeth between a stationary clamp position pushing against the side of the row of teeth for holding winding wire in place and an open position, in which stationary clamp position the pliant bearing surface of said clamp means bears against a portion of one side of the row of teeth conforming to the surface of any winding already formed around select teeth so that the winding wire is held in place while the needle mounting means moves relative to the stack mounting means back and forth over the row of teeth.

10. The stack winding apparatus of claim 9 wherein each clamp means comprises first and second flat pliable surface pushers mounted on the clamp mounting means, said first and second pliable surface pushers being spaced apart from each other for engaging in the clamp position the side of a row of teeth at different tooth locations.

11. The stack winding apparatus of claim 9 wherein the clamp mounting means comprises clamp yoke means formed with first and second yoke arms and clamp motor means for extending and retracting the yoke arms and flat pliable surface pushers between the clamp position and open position.

12. Apparatus for winding wire around selected teeth of a toothed or slotted stack having a row of teeth, including wire feed winding guide means for guiding wire around selected teeth of a toothed or slotted stack, and stack mounting means constructed and arranged for operatively mounting a toothed or slotted stack relative to the wire feed winding guide means, the improvement comprising:

wire holding clamp means operatively positioned on either side of a row of teeth of a toothed or slotted stack mounted on the stack mounting means, each said clamp means formed with a substantially flat pliant bearing surface in the direction facing said teeth;

clamp mounting means operatively mounting each said clamp means for movement toward and away from said row of teeth between a stationary clamp position pushing against the side of the row of teeth for holding winding wire in place and an open position, in which stationary clamp position the pliant bearing surface of the clamp means bears against a portion of one side of the row of teeth conforming to the surface of any winding already formed around selected teeth so that the winding wire is held in place against the side of the row of teeth while the wire feed winding guide means is guiding wire; and clamp motor means operatively coupled to the clamp mounting means for moving said clamp means alternatively between the stationary clamp position and the open position to facilitate selective winding of wire around selected teeth.

13. The apparatus of claim 12 wherein each said clamp means comprise first and second spaced apart pliable surface pushers mounted on the clamp mounting means for engaging in the clamp position the side of a row of teeth at different tooth locations.

14. The apparatus of claim 13 wherein said clamp mounting means comprises clamp yoke means having first and second yoke arms, said clamp motor means being operatively coupled to the clamp yoke means for moving the pliable surface pushers between the stationary clamp position and the open position.

* * * * *